US009767822B2

(12) United States Patent
Villette et al.

(10) Patent No.: US 9,767,822 B2
(45) Date of Patent: Sep. 19, 2017

(54) DEVICES FOR ENCODING AND DECODING A WATERMARKED SIGNAL

(75) Inventors: Stephane Pierre Villette, San Diego, CA (US); Daniel J. Sinder, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1090 days.

(21) Appl. No.: 13/276,096

(22) Filed: Oct. 18, 2011

(65) Prior Publication Data

US 2012/0203555 A1 Aug. 9, 2012

Related U.S. Application Data

(60) Provisional application No. 61/440,338, filed on Feb. 7, 2011.

(51) Int. Cl.

| | |
|---|---|
| ***G10L 21/00*** | (2013.01) |
| ***G10L 21/038*** | (2013.01) |
| *G10L 19/00* | (2013.01) |
| *G06K 5/00* | (2006.01) |
| *H04L 9/32* | (2006.01) |
| *H04L 12/28* | (2006.01) |
| *G06F 17/00* | (2006.01) |
| *G06K 9/00* | (2006.01) |

(Continued)

(52) U.S. Cl.
CPC .......... *G10L 21/038* (2013.01); *G10L 19/008* (2013.01); *G10L 19/018* (2013.01); *G10L 19/24* (2013.01); *G10L 25/18* (2013.01)

(58) Field of Classification Search
USPC ....... 704/500, 201, 270, 205, 219, 223, 229, 704/211; 700/94; 713/176; 381/119, 381/100; 382/100; 235/382
See application file for complete search history.

(56) References Cited

U.S. PATENT DOCUMENTS 6,061,793 A * 5/2000 Tewfik et al. ................ 713/176
6,330,672 B1 12/2001 Shur (Continued)

FOREIGN PATENT DOCUMENTS

CN 1437169 A 8/2003
CN 1575492 A 2/2005

(Continued)

OTHER PUBLICATIONS

Backwards compatible wideband telephony in mobile networks: CELP watermarking and bandwidth extension by Bernd Geiser and Peter Vary, IEEE 2007.*

(Continued)

*Primary Examiner* — Neeraj Sharma
(74) *Attorney, Agent, or Firm* — Austin Rapp & Hardman, P.C.

(57) ABSTRACT

An electronic device configured for encoding a watermarked signal is described. The electronic device includes modeler circuitry. The modeler circuitry determines parameters based on a first signal and a first-pass coded signal. The electronic device also includes coder circuitry coupled to the modeler circuitry. The coder circuitry performs a first-pass coding on a second signal to obtain the first-pass coded signal and performs a second-pass coding based on the parameters to obtain a watermarked signal.

44 Claims, 10 Drawing Sheets

(51) Int. Cl.

| | |
|---|---|
| *H04B 1/00* | (2006.01) |
| *G10L 19/008* | (2013.01) |
| *G10L 19/018* | (2013.01) |
| *G10L 19/24* | (2013.01) |
| *G10L 25/18* | (2013.01) |

(56) References Cited

U.S. PATENT DOCUMENTS 6,332,030 B1 12/2001 Manjunath et al.
6,418,424 B1 7/2002 Hoffberg et al.
6,442,285 B2 8/2002 Rhoads et al.
6,493,457 B1 12/2002 Quackenbush et al.
7,330,814 B2* 2/2008 McCree ................ G10L 21/038 704/219
7,389,420 B2 6/2008 Tian
7,596,492 B2 9/2009 Sung et al.
7,860,992 B2 12/2010 Robinson
7,974,846 B2 7/2011 Tsuchinaga et al.
8,151,113 B2 4/2012 Rhoads
8,326,641 B2* 12/2012 Song ................... G10L 19/0204 704/500
8,768,690 B2* 7/2014 Gupta ..................... G10L 19/22 704/207
2001/0040977 A1* 11/2001 Nakano ................. G06T 1/0021 382/100
2001/0049788 A1 12/2001 Shur
2002/0128839 A1 9/2002 Lindgren et al.
2003/0088327 A1* 5/2003 Taori et al. ..................... 700/94
2003/0154073 A1 8/2003 Ota et al.
2003/0163305 A1 8/2003 Cheng et al.
2004/0068399 A1 4/2004 Ding
2004/0068404 A1 4/2004 Tanaka et al.
2004/0186735 A1* 9/2004 Ferris et al. .................. 704/500
2004/0252700 A1* 12/2004 Anandakumar .. H04L 29/06027 370/395.21
2005/0002526 A1 1/2005 Choi et al.
2005/0065785 A1* 3/2005 Bessette .................. G10L 19/10 704/211
2005/0094848 A1 5/2005 Carr et al.
2005/0177364 A1* 8/2005 Jelinek .................... G10L 19/24 704/214
2006/0020450 A1* 1/2006 Miseki .................... G10L 19/18 704/219
2006/0045309 A1 3/2006 Suthaharan
2006/0075241 A1 4/2006 Deguillaume et al.
2006/0133624 A1* 6/2006 Waserblat .............. H04H 60/04 381/119
2006/0173677 A1 8/2006 Sato et al.
2006/0239502 A1 10/2006 Petrovic et al.
2006/0271355 A1* 11/2006 Wang .................... G10L 19/005 704/220
2006/0282263 A1 12/2006 Vos et al.
2007/0061577 A1* 3/2007 Van De Kerkhof .. G10L 19/018 713/176
2007/0094009 A1 4/2007 Ryu et al.
2007/0217626 A1* 9/2007 Sharma ................. G06T 1/0028 381/100
2008/0027711 A1* 1/2008 Rajendran et al. ........... 704/201
2008/0250091 A1 10/2008 Lacy et al.
2008/0263359 A1 10/2008 Radzishevsky
2008/0288263 A1 11/2008 Jung et al.
2009/0094264 A1 4/2009 Nurminen et al.
2009/0240491 A1* 9/2009 Reznik .................... G10L 19/24 704/219
2009/0326961 A1* 12/2009 Petrovic et al. .............. 704/500
2010/0106269 A1 4/2010 Garudadri et al.
2010/0174537 A1* 7/2010 Vos ......................... G10L 19/12 704/219
2010/0228541 A1 9/2010 Oshikiri
2011/0033081 A1 2/2011 Davidson et al.
2011/0119054 A1* 5/2011 Lee ......................... G10L 19/20 704/203
2011/0125505 A1* 5/2011 Vaillancourt ......... G10L 19/005 704/500
2011/0131047 A1 6/2011 Geiser et al.
2011/0208514 A1 8/2011 Tsuchinaga et al.
2011/0224994 A1* 9/2011 Norvell ................. G10L 19/008 704/500
2011/0307248 A1* 12/2011 Yamanashi ........... G10L 21/038 704/205
2012/0022879 A1 1/2012 Srinivasan
2012/0053950 A1* 3/2012 Oshikiri ................ G10L 19/005 704/500
2012/0185256 A1* 7/2012 Virette .................. G10L 19/002 704/500
2012/0203556 A1 8/2012 Villette et al.
2012/0203561 A1 8/2012 Villette et al.
2012/0221342 A1 8/2012 Oshikiri

FOREIGN PATENT DOCUMENTS

CN 101262418 A 9/2008
CN 101271690 A 9/2008
CN 101345054 A 1/2009
CN 101577605 A 11/2009
EP 1503369 A2 2/2005
EP 1959432 A1 8/2008
JP H10513571 A 12/1998
JP 2003295879 A 10/2003
JP 2004069963 A 3/2004
JP 2004310117 A 11/2004
JP 2004348120 A 12/2004
JP 2005049794 A 2/2005
JP 2005506584 A 3/2005
JP 2005513543 A 5/2005
JP 2006524358 A 10/2006
JP 2007048340 A 2/2007
JP 2008539671 A 11/2008
JP 2009518945 A 5/2009
JP 2010020333 A 1/2010
TW 200943899 A 10/2009
WO WO-9624925 A1 8/1996
WO WO-0062501 A2 10/2000
WO WO03036624 A1 5/2003
WO WO03047138 A1 6/2003
WO WO-03053064 A1 6/2003
WO WO-2004090886 A1 10/2004
WO WO-2006116394 A2 11/2006
WO WO2007043811 A1 4/2007
WO 2007051124 5/2007
WO WO-2007063913 A1 6/2007
WO WO2008016947 2/2008
WO WO-2010059342 A1 5/2010

OTHER PUBLICATIONS

Taiwan Search Report—TW101100829—TIPO—Mar. 7, 2014.

Bernd Geiser., et al., "High rate data hiding in ACELP speech codecs", Acoustics, Speech and Signal Processing, 2008, ICASSP 2008, IEEE International Conference on, IEEE, Piscataway, NJ, USA, Mar. 31, 2008 (Mar. 31, 2008), pp. 4005-4008, XP031251474, ISBN : 978-1-4244-1483-3 paragraph [03.2] ; table 2.

International Search Report and Written Opinion—PCT/US2012/020773—ISA/EPO—Apr. 3, 2012.

Ding, H.,"Wideband Audio Over Narrowband Low-Resolution Media," IEEE International Conference on Acoustics, Speech, and Signal Processing, 2004. (ICASSP '04). vol. 1, May 17-21, 2004, pp. 1-489 to 1-492.

Geiser, B., et al., "Artificial Bandwidth Extension of Speech Supported by Watermark-Transmitted Side Information", Inter Speech, Institute of Communication Systems and Data Processing, Sep. 4-8, 2005, pp. 1497-1500.

Geiser, B., et al., "Backwards Compatible wideband Telephony in Mobile Networks: CELP Watermarking and Bandwidth Extension", IEEE, Institute of Communication Systems and Data Processing, 2007, pp. IV 533-536.

Geiser, B., et al., "Robust Wideband Enhancement of Speech by Combined Coding and Artificial Bandwidth Extension", Institute of Communication Systems and Data Processing, Jan. 2005, pp. 21-24.

(56) References Cited

OTHER PUBLICATIONS

Loo, P., et al., “Watermark Detection Based on the Properties of Error Control Codes”, IEE Proc.-Vis. Image Signal Process., vol. 150, No. 2, Apr. 2003, pp. 115-121.
Luo, Z. et al., “Wideband Audio Over Narrow Band Based on Digital Watermarking”, IEEE, School of Information Technology and Engineering, Jun. 2010, pp. 697-701.
Nishimura, A. et al., “Data Hiding in Pitch Delay Data of the Adaptive Multi-Rate Narrow-band Speech Codec”, IEEE, Fifth International Conference on Intelligent Information Hiding and Multimedia Signal Processing, 2009, pp. 483-486.
Vary, P. et al., “Steganographic Wideband Telephony Using Narrowband Speech Codecs”, Conference Record of the Forty-First Asilomar Conference on Signals, Systems and Computers, 2007, pp. 1475-1479, Nov. 4-7, 2007. doi: 10.1109/ACSSC.2007.4487475.

* cited by examiner

DEVICES FOR ENCODING AND DECODING A WATERMARKED SIGNAL

RELATED APPLICATIONS

This application is related to and claims priority from U.S. Provisional Patent Application Ser. No. 61/440,338 filed Feb. 7, 2011, for "WATERMARKING FOR CODEC EXTENSION."

TECHNICAL FIELD

The present disclosure relates generally to electronic devices. More specifically, the present disclosure relates to devices for encoding and decoding a watermarked signal.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) use audio or speech signals. These electronic devices may encode speech signals for storage or transmission. For example, a cellular phone captures a user's voice or speech using a microphone. For instance, the cellular phone converts an acoustic signal into an electronic signal using the microphone. This electronic signal may then be formatted for transmission to another device (e.g., cellular phone, smart phone, computer, etc.) or for storage.

Improved quality or additional capacity in a communicated signal is often sought for. For example, cellular phone users may desire greater quality in a communicated speech signal. However, improved quality or additional capacity may often require greater bandwidth resources and/or new network infrastructure. As can be observed from this discussion, systems and methods that allow efficient signal communication may be beneficial.

SUMMARY

An electronic device configured for encoding a watermarked signal is disclosed. The electronic device includes modeler circuitry. The modeler circuitry determines parameters based on a first signal and a first-pass coded signal. The electronic device also includes coder circuitry coupled to the modeler circuitry. The coder circuitry performs a first-pass coding on a second signal to obtain the first-pass coded signal and performs a second-pass coding based on the parameters to obtain a watermarked signal. The electronic device may also include a transmitter for sending the watermarked signal. The first-pass coded signal may be a first-pass coded excitation. The modeler circuitry may determine the parameters based on high band coding. The watermarked signal may be decodable to recover a version of the second signal without information from the first signal.

The electronic device may include an analysis filter bank for dividing a signal into the first signal and the second signal. The first signal may be a higher frequency component signal and the second signal may be a lower frequency component signal.

The coder circuitry may include an adaptive multi-rate narrowband (AMR-NB) coder. The coder circuitry may perform the second-pass coding using a watermarking codebook. The second-pass coding may use a set of linear predictive coding coefficients obtained from the first-pass coding.

An electronic device configured for decoding a watermarked signal is also disclosed. The electronic device includes modeler circuitry that produces a decoded first signal based on a decoded second signal and a watermarked bitstream. The electronic device also includes decoder circuitry coupled to the modeler circuitry that provides the decoded second signal based on the watermarked bitstream. The decoded first signal may include a higher frequency component signal and the decoded second signal may include a lower frequency component signal.

The electronic device may include combining circuitry that combines the decoded first signal and the decoded second signal. The combining circuitry may include a synthesis filter bank.

A method for encoding a watermarked signal on an electronic device is also disclosed. The method includes obtaining a first signal and a second signal. The method also includes performing a first-pass coding on the second signal to obtain a first-pass coded signal. The method further includes determining parameters based on the first signal and the first-pass coded signal. The method additionally includes performing a second-pass coding based on the parameters to obtain a watermarked signal.

A method for decoding a watermarked signal on an electronic device is also disclosed. The method includes decoding a watermarked bitstream to obtain a decoded second signal. The method also includes decoding the watermarked bitstream based on the decoded second signal to obtain a decoded first signal.

A computer-program product for encoding a watermarked signal is also disclosed. The computer-program product includes a non-transitory tangible computer-readable medium with instructions. The instructions include code for causing an electronic device to obtain a first signal and a second signal. The instructions also include code for causing the electronic device to perform a first-pass coding on the second signal to obtain a first-pass coded signal. The instructions further include code for causing the electronic device to determine parameters based on the first signal and the first-pass coded signal. The instructions additionally include code for causing the electronic device to perform a second-pass coding based on the parameters to obtain a watermarked signal.

A computer-program product for decoding a watermarked signal is also disclosed. The computer-program product includes a non-transitory tangible computer-readable medium with instructions. The instructions include code for causing an electronic device to decode a watermarked bitstream to obtain a decoded second signal. The instructions also include code for causing the electronic device to decode the watermarked bitstream based on the decoded second signal to obtain a decoded first signal.

An apparatus for encoding a watermarked signal is also disclosed. The apparatus includes means for obtaining a first signal and a second signal. The apparatus also includes means for performing a first-pass coding on the second signal to obtain a first-pass coded signal. The apparatus further includes means for determining parameters based on the first signal and the first-pass coded signal. The apparatus additionally includes means for performing a second-pass coding based on the parameters to obtain a watermarked signal.

An apparatus for decoding a watermarked signal is also disclosed. The apparatus includes means for decoding a watermarked bitstream to obtain a decoded second signal. The apparatus further includes means for decoding the watermarked bitstream based on the decoded second signal to obtain a decoded first signal.

DETAILED DESCRIPTION

Figure 1:
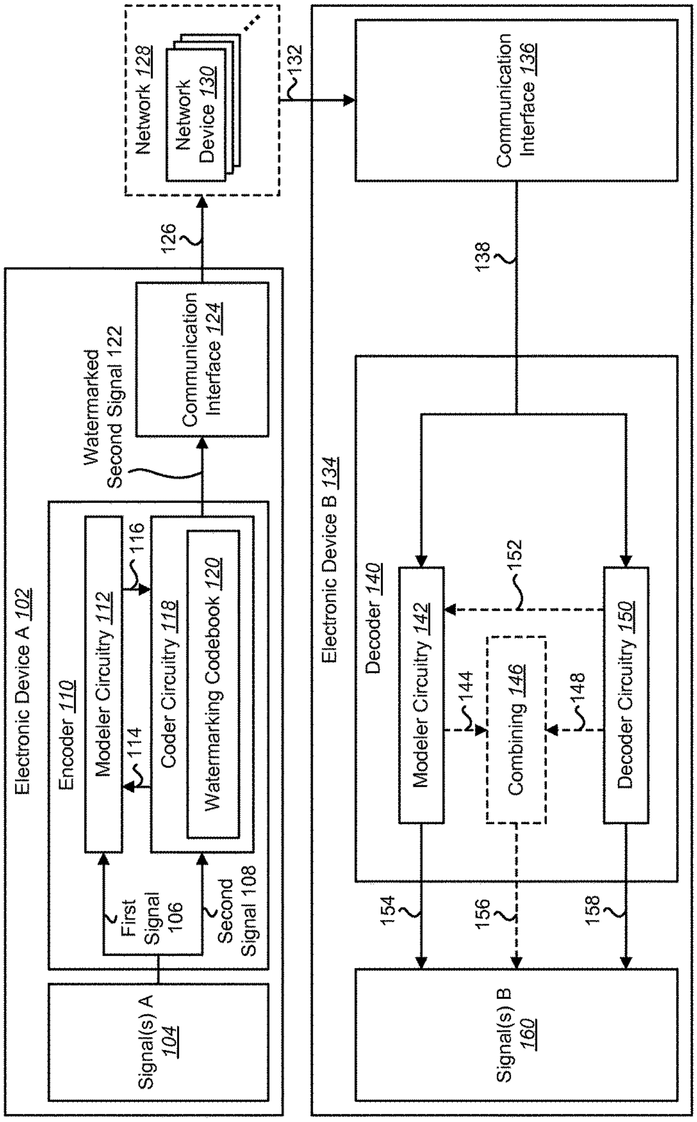
FIG. 1 is a block diagram illustrating one configuration of electronic devices in which systems and methods for encoding and decoding a watermarked signal may be implemented.

The systems and methods disclosed herein may be applied to a variety of electronic devices. Examples of electronic devices include voice recorders, video cameras, audio players (e.g., Moving Picture Experts Group-1 (MPEG-1) or MPEG-2 Audio Layer 3 (MP3) players), video players, audio recorders, desktop computers, laptop computers, personal digital assistants (PDAs), gaming systems, etc. One kind of electronic device is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers.

An electronic device or communication device may operate in accordance with certain industry standards, such as International Telecommunication Union (ITU) standards and/or Institute of Electrical and Electronics Engineers (IEEE) standards (e.g., Wireless Fidelity or "Wi-Fi" standards such as 802.11a, 802.11b, 802.11g, 802.11n and/or 802.11ac). Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE), Global System for Mobile Telecommunications (GSM) and others (where a communication device may be referred to as a User Equipment (UE), Node B, evolved Node B (eNB), mobile device, mobile station, subscriber station, remote station, access terminal, mobile terminal, terminal, user terminal, subscriber unit, etc., for example). While some of the systems and methods disclosed herein may be described in terms of one or more standards, this should not limit the scope of the disclosure, as the systems and methods may be applicable to many systems and/or standards.

It should be noted that some communication devices may communicate wirelessly and/or may communicate using a wired connection or link. For example, some communication devices may communicate with other devices using an Ethernet protocol. The systems and methods disclosed herein may be applied to communication devices that communicate wirelessly and/or that communicate using a wired connection or link. In one configuration, the systems and methods disclosed herein may be applied to a communication device that communicates with another device using a satellite.

One configuration of the systems and methods may be used for the extension of code-excited linear prediction (CELP) speech coders using watermarking techniques to embed data that is dependent on the original carrier bit stream. More simply, the systems and methods disclosed herein may provide watermarking for the extension of CELP codecs.

Wideband (e.g., 0-7 kilohertz (kHz)) coding of speech provides superior quality to narrowband (e.g., 0-4 kHz) coding of speech. However, the majority of existing mobile communication networks support narrowband coding only (e.g., adaptive multi-rate narrowband (AMR-NB)). Deploying wideband coders (e.g., adaptive multi-rate wideband (AMR-WB)) may require substantial and costly changes to infrastructure and service deployment.

Furthermore, the next generation of services may support wideband coders (e.g., AMR-WB), while super-wideband (e.g., 0-14 kHz) coders are being developed and standardized. Again, operators may eventually face the costs of deploying yet another codec to move customers to super-wideband.

One configuration of the systems and methods disclosed herein may use an advanced model that can encode additional bandwidth very efficiently and hide this information in a bitstream already supported by existing network infrastructure. The information hiding may be performed by watermarking the bitstream. One example of this technique watermarks the fixed codebook of a CELP coder. For example, the upper band of a wideband input (e.g., 4-7 kHz) may be encoded and carried as a watermark in a narrowband coder's bitstream. In another example, the upper band of a super-wideband input (e.g., 7-14 kHz) may be encoded and carried as a watermark in a wideband coder's bitstream. Other secondary bitstreams, perhaps unrelated to bandwidth extension, may be carried as well. One example that faces similar challenges is the inclusion of parametric stereo data embedded in a monophonic stream. This technique allows the encoder to produce a bitstream compatible with existing infrastructures. A legacy decoder may produce a narrowband output with a quality similar to standard encoded speech (without the watermark, for example), while a decoder that is aware of the watermark may produce wideband speech.

Several technical obstacles in watermarking the information for bandwidth extension have remained that have impeded development of practical systems. Importantly, an encoding model that is sufficiently efficient and a means for applying it to the problem have not been readily available or obvious.

In order to increase or maximize quality, the watermarked information should be as small as possible in order to minimize its impact on the quality of the original bitstream (e.g., a "carrier" bitstream containing the low band). This can be achieved using an advanced model for the high-band, such as the efficient non-linear extension model used in the enhanced variable rate wideband codec (EVRC-WB). However, this model relies on the low band excitation for generating the high-band speech parameters, and consequently the high-band bits. However, the low band excitation is affected by the high-band bits through the watermarking process. Therefore, approximations may be made to escape this loop.

In accordance with the systems and methods disclosed herein, a first-pass of the carrier encoder may be conducted, with no watermark. The resultant signal (e.g., excitation, residual, etc.) is used for calculating the embedded parameters (e.g., the high-band model parameters or other data such as parametric stereo). Then, a second-pass of the carrier encoder is performed, with the watermark (from the embedded parameters) applied to the low-band encoding process. In this way, the cyclical dependency is broken. Running two passes of the encoder may not be an issue, as the complexity of the legacy narrower bandwidth codec is generally quite small compared to current state-of-the art codecs that encode wider bandwidths.

One alternative to this approach would be to use the linear predictive coding (LPC) residual instead of the coded first-pass residual from the carrier encoder as the input to the high-band model. However, this degrades quality, as there may be a bigger mismatch between the signal used to calculate the high-band parameters, and the signal that will be used eventually at the decoder.

Any other solutions to the cyclical dependency problem are currently unknown. However, one alternative would be to use a high-band encoding technique that does not depend on the low band. However, it is unlikely that such a technique would be as efficient as one which leverages the low-band to extrapolate the high band. With this inefficiency, the quality impact of the watermark on the low-band carrier bitstream would likely be more significant.

Various configurations are now described with reference to the Figures, where like element names may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of electronic devices 102, 134 in which systems and methods for encoding and decoding a watermarked signal may be implemented. Examples of electronic device A 102 and electronic device B 134 may include wireless communication devices (e.g., cellular phones, smart phones, personal digital assistants (PDAs), laptop computers, e-readers, etc.) and other devices.

Electronic device A 102 may include an encoder block/module 110 and/or a communication interface 124. The encoder block/module 110 may be used to encode and watermark a signal. The communication interface 124 may transmit one or more signals to another device (e.g., electronic device B 134).

Electronic device A 102 may obtain one or more signals A 104, such as audio or speech signals. For example, electronic device A 102 may capture signal A 104 using a microphone or may receive signal A 104 from another device (e.g., a Bluetooth headset). In some configurations, signal A 104 may be divided into different component signals (e.g., a higher frequency component signal and a lower frequency component signal, a monophonic signal and a stereo signal, etc.). In other configurations, unrelated signals A 104 may be obtained. Signal(s) A 104 may be provided to modeler circuitry 112 and coder circuitry 118 in an encoder 110. For example, a first signal (e.g., signal component) 106 may be provided to the modeler circuitry 112, while a second signal (e.g., another signal component) 108 is provided to the coder circuitry 118.

It should be noted that one or more of the elements 110, 112, 118, 124 included in electronic device A 102 may be implemented in hardware, software or a combination of both. For instance, the term "circuitry" as used herein may indicate that an element may be implemented using one or more circuit components, including processing blocks and/or memory cells. Thus, one or more of the elements 110, 112, 118, 124 included in electronic device A 102 may be implemented as one or more integrated circuits, application specific integrated circuits (ASICs), etc., and/or using a processor and instructions. It should also be noted that the term "block/module" may be used to indicate that an element may be implemented in hardware, software or a combination of both.

The coder circuitry 118 may perform coding on the second signal 108. For example, the coder circuitry 118 may perform adaptive multi-rate (AMR) coding on the second signal 108. The modeler circuitry 112 may determine or calculate parameters or data 116 that may be embedded into the second signal (e.g., "carrier" signal) 108. For example, the coder circuitry 118 may produce a coded bitstream that watermark bits may be embedded into. In another example, the modeler circuitry 112 may separately encode the first signal 106 into bits 116 that can be embedded into the coded bitstream. In some configurations, the modeler circuitry 112 may determine the parameters or data 116 based on high band coding. For instance, the modeler circuitry 112 may use a high band part of the enhanced variable rate wideband (EVRC-WB) codec. Other high band coding techniques may be used. The coded second signal 108 with the embedded watermark signal may be referred to as a watermarked second signal 122.

The coder circuitry 118 may perform a first-pass coding on the second signal 108. This first-pass coding may produce data 114 (e.g., a first-pass coded signal, a first-pass coded excitation 114, etc.), which may be provided to the modeler circuitry 112. In one configuration, the modeler circuitry 112 may use an EVRC-WB model to model higher frequency components (from the first signal 106) that relies on lower frequency components (from the second signal 108) that may be encoded by the coder circuitry 118. Thus, the first-pass coded excitation 114 may be provided to the modeler circuitry 112 for use in modeling the higher frequency components. The resulting higher frequency component parameters or bits 116 may then be embedded into the second signal 108 in a second-pass coding, thereby producing the watermarked second signal 122. For example, the second-pass coding may involve the use of a watermarking codebook (e.g., fixed codebook or FCB) 120 to embed high-band bits 116 into a coded second signal 108 to produce the watermarked second signal (e.g., a watermarked bitstream) 122.

It should be noted that the watermarking process may alter some of the bits of an encoded second signal 108. For example, the second signal 108 may be referred to as a "carrier" signal or bitstream. In the watermarking process, some of the bits that make up the encoded second signal 108 may be altered in order to embed or insert the data or bits 116 derived from the first signal 106 into the second signal 108 to produce the watermarked second signal 122. In some cases, this may be a source of degradation in the encoded second signal 108. However, this approach may be advantageous since decoders that are not designed to extract the watermarked information may still recover a version of the second signal 108, without the extra information provided by the first signal 106. Thus, "legacy" devices and infrastructure may still function regardless of the watermarking. This approach further allows other decoders (that are designed to extract the watermarked information) to be used to extract the additional watermark information provided by the first signal 106.

The watermarked second signal (e.g., bitstream) 122 may be provided to the communication interface 124. Examples of the communication interface 124 may include transceivers, network cards, wireless modems, etc. The communication interface 124 may be used to communicate (e.g., transmit) the watermarked second signal 122 to another device, such as electronic device B 134 over a network 128. For example, the communication interface 124 may be based on wired and/or wireless technology. Some operations performed by the communication interface 124 may include modulation, formatting (e.g., packetizing, interleaving, scrambling, etc.), upconversion, amplification, etc. Thus, electronic device A 102 may transmit a signal 126 that comprises the watermarked second signal 122.

The signal 126 (including the watermarked second signal 122) may be sent to one or more network devices 130. For example, a network 128 may include the one or more network devices 130 and/or transmission mediums for communicating signals between devices (e.g., between electronic device A 102 and electronic device B 134). In the configuration illustrated in FIG. 1, the network 128 includes one or more network devices 130. Examples of network devices 130 include base stations, routers, servers, bridges, gateways, etc.

In some cases, one or more network devices 130 may transcode the signal 126 (that includes the watermarked second signal 122). Transcoding may include decoding the transmitted signal 126 and re-encoding it (into another format, for example). In some cases, transcoding the signal 126 may destroy the watermark information embedded in the signal 126. In such a case, electronic device B 134 may receive a signal that no longer contains the watermark information. Other network devices 130 may not use any transcoding. For instance, if a network 128 uses devices that do not transcode signals, the network may provide tandem-free/transcoder-free operation (TFO/TrFO). In this case, the watermark information embedded in the watermarked second signal 122 may be preserved as it is sent to another device (e.g., electronic device B 134).

Electronic device B 134 may receive a signal 132 (via the network 128), such as a signal 132 having watermark information preserved or a signal 132 without watermark information. For instance, electronic device B 134 may receive a signal 132 using a communication interface 136. Examples of the communication interface 136 may include transceivers, network cards, wireless modems, etc. The communication interface 136 may perform operations such as downconversion, synchronization, de-formatting (e.g., de-packetizing, unscrambling, de-interleaving, etc.) on the signal 132. The resulting signal 138 (e.g., a bitstream from the received signal 132) may be provided to a decoder block/module 140. For example, the signal 138 may be provided to modeler circuitry 142 and to decoder circuitry 150.

If watermarked information is embedded on the signal 138, the modeler circuitry 142 may model and/or decode the watermark information (e.g., watermark bits) embedded on the signal (e.g., bitstream) 138. For example, the decoder 140 may extract watermark bits from the signal 138. The modeler circuitry 142 may decode these watermark bits to produce a decoded first signal 154, 144.

The decoder circuitry 150 may decode the signal 138. In some configurations, the decoder circuitry 150 may use a "legacy" decoder (e.g., a standard narrowband decoder) or decoding procedure that decodes the signal 138 regardless of any watermark information that may be included in the signal 138. The decoder circuitry 150 may produce a decoded second signal 148, 152, 158. Thus, for example, if no watermark information is included in the signal 138, the decoder circuitry 150 may still recover a version of the second signal 108, which is the decoded second signal 158.

In some configurations, the operations performed by the modeler circuitry 142 may depend on operations performed by the decoder circuitry 150. For example, a model (e.g., EVRC-WB) used for a higher frequency band may depend on a decoded narrowband signal 152 (decoded using AMR-NB, for example). In this case, the decoded narrowband signal 152 may be provided to the modeler circuitry 142.

In some configurations, a decoded second signal 148 may be combined with a decoded first signal 144 by a combining block/module 146 (e.g., combining circuitry 146) to produce a combined signal 156. In other configurations, the watermark bits from the signal 138 and the signal (itself) 138 may be decoded separately to produce the decoded first signal 154 and the decoded second signal 158. Thus, one or more signals B 160 may include a decoded first signal 154 and a separate decoded second signal 158 and/or may include a combined signal 156. It should be noted that the decoded first signal 154, 144 may be a decoded version of the first signal 106 encoded by electronic device A 102. Additionally or alternatively, the decoded second signal 148, 152, 158 may be a decoded version of the second signal 108 encoded by electronic device A 102.

If no watermarked information is embedded in the received signal 132, the decoder circuitry 150 may decode the signal 138 (in a legacy mode, for example) to produce the decoded second signal 158. This may provide a decoded second signal 158, without the additional information provided by the first signal 106. This may occur, for example, if the watermark information (from the first signal 106, for example) is destroyed in a transcoding process in the network 128.

In some configurations, electronic device B 134 may be incapable of decoding the watermark signal or bits embedded in the received signal 132. For example, electronic device B 134 may not include modeler circuitry 142 for extracting the embedded watermark signal in some configurations. In such a case, electronic device B 134 may simply decode the signal 138 to produce the decoded second signal 158.

It should be noted that one or more of the elements 140, 142, 146, 150, 136 included in electronic device B 134 may be implemented in hardware (e.g., circuitry), software or a combination of both. For instance, one or more of the elements 140, 142, 146, 150, 136 included in electronic device B 134 may be implemented as one or more integrated circuits, application specific integrated circuits (ASICs), etc., and/or using a processor and instructions.

Figure 2:
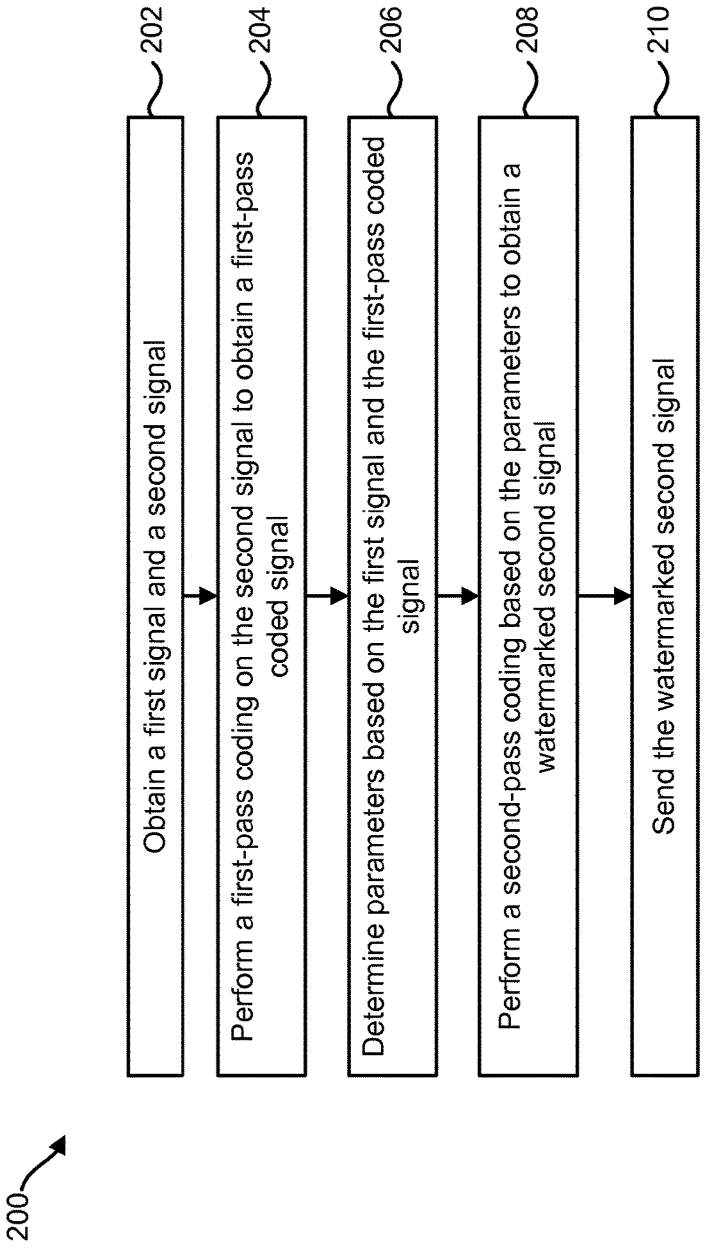
FIG. 2 is a flow diagram illustrating one configuration of a method for encoding a watermarked signal.

FIG. 2 is a flow diagram illustrating one configuration of a method 200 for encoding a watermarked signal. An electronic device (e.g., wireless communication device) 102 may obtain 202 a first signal 106 and a second signal 108. For example, the electronic device 102 may capture or receive one or more signals 104. The electronic device 102 may optionally divide a signal 104 into a first signal 106 and a second signal 108. In some configurations, the signal 104 may be divided using an analysis filter bank. This may be done, for example, when high and low frequency components of a speech signal are to be encoded as a watermarked signal. In such a case, the lower components (e.g., the second signal 108) may be conventionally encoded and the higher components (e.g., the first signal 106) may be embedded as a watermark on the conventionally encoded signal. In other configurations, the electronic device 102 may simply have a separate signal or portion of information (e.g., the first signal 106) to be embedded within a "carrier" signal (e.g., the second signal 108). For instance, the electronic device 102 may obtain 202 a first signal 106 and a second signal 108, where the first signal 106 is to be embedded within the second signal 108.

The electronic device 102 may perform 204 a first-pass coding on the second signal 108 to obtain a first-pass coded signal 114. For example, the electronic device may perform AMR-NB encoding on the second signal 108 to obtain the first-pass coded signal 114. In some configurations, the first-pass coded signal 114 may be an excitation signal, while in other configurations (e.g., embedding parametric stereo), the first-pass coded signal 114 may not be an excitation signal. In the first pass, a full encoding may be performed in some configurations. In the case of bandwidth extension, for instance, the first-pass coded signal 114 that is used by a non-linear model (e.g., the modeler circuitry 112) is an excitation. In the case of parametric stereo, for example, the first-pass coded signal 114 may be an actual coded speech signal. It should also be noted that the electronic device 102 may generate linear predictive coding (LPC) coefficients in the first-pass coding that may be used in a second-pass coding (in some configurations).

The electronic device 102 may determine 206 parameters (e.g., parameters, data, bits, etc.) 116 based on the first signal 106 and the first-pass coded signal 114. For example, in the case where the additional information that is to be embedded on the carrier signal (e.g., second signal 108) contains higher frequency components of a speech signal, the electronic device 102 may model or determine the parameters 116 for the higher frequency components (e.g., the first signal 106) based on a first-pass coded excitation 114. In some configurations, the electronic device 102 may determine 206 the parameters based on high band coding. For instance, the electronic device 102 may use EVRC-WB (e.g., a high band part of the EVRC-WB codec) modeling of the first signal 106 (e.g., higher frequency component signal) to generate the parameters 116. Other high band coding techniques may be used.

The electronic device 102 may then perform 208 a second-pass coding based on the parameters 116 to obtain a watermarked second signal 122. For example, the electronic device 102 may use the modeling parameters 116 in conjunction with a watermarking codebook 120 to generate the watermarked second signal 122 (e.g., embed the watermark information). In some configurations, the second pass may also use LPC coefficients (e.g., line spectral frequencies (LSFs) or line spectral pairs (LSPs)) generated from the first-pass coding to produce the watermarked second signal 122.

The electronic device 102 may send 210 the watermarked second signal 122. For example, the electronic device 102 may transmit a signal 126 comprising the watermarked second signal 122 to another device (e.g., electronic device B 134) via a network 128.

Figure 3:
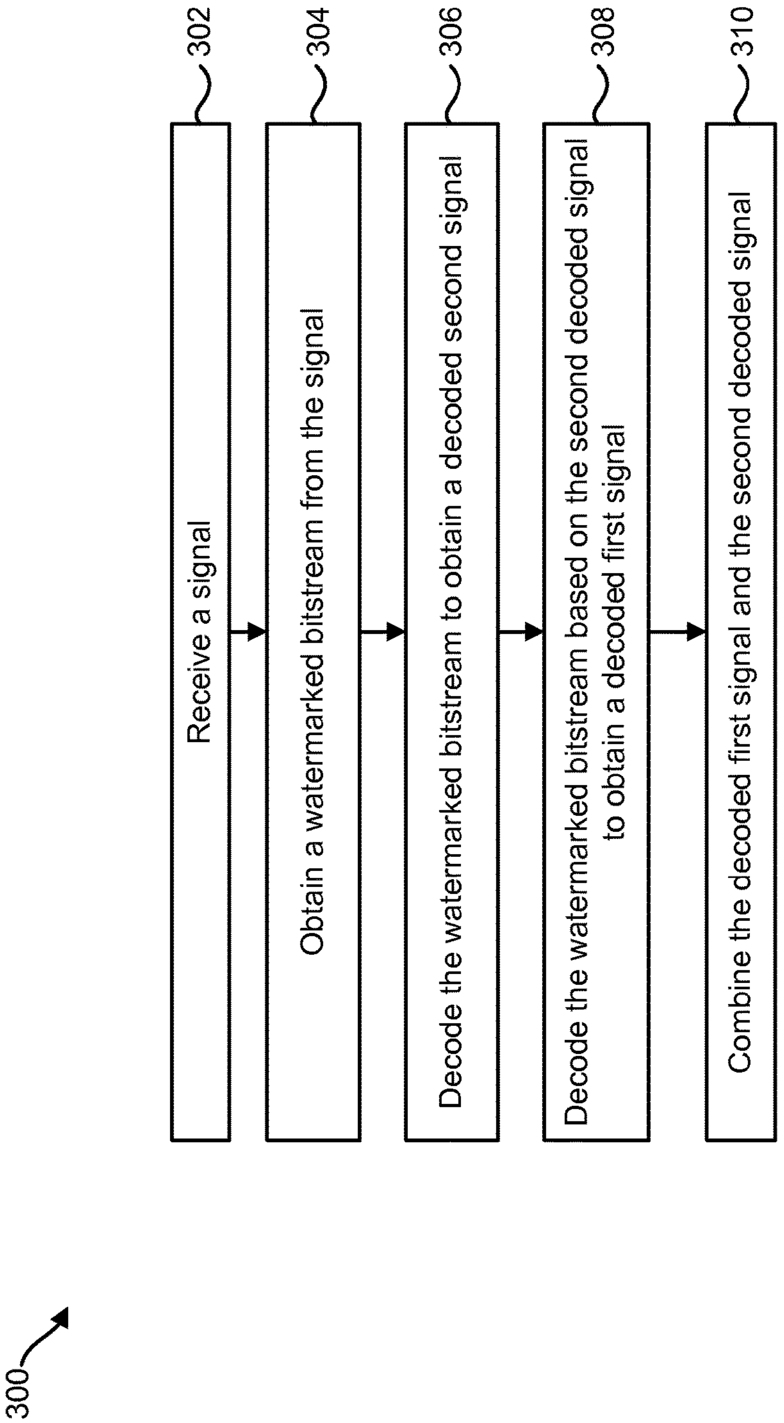
FIG. 3 is a flow diagram illustrating one configuration of a method for decoding a watermarked signal.

FIG. 3 is a flow diagram illustrating one configuration of a method 300 for decoding a watermarked signal. An electronic device 134 may receive 302 a signal 132. For example, the electronic device 134 may receive 302 a signal 132 that includes the watermarked second signal 122 (e.g., a watermarked bitstream).

The electronic device 134 may obtain 304 a watermarked bitstream 138 from the signal 132. For example, the electronic device 134 may perform one or more operations to extract the watermarked bitstream 138 from the received signal 132. For instance, the electronic device 134 may downconvert, amplify, channel decode, demodulate, deformat (e.g., de-interleave, unscramble, etc.), etc., the received signal 132 in order to obtain 304 the watermarked bitstream 138.

The electronic device 134 may decode 306 the watermarked bitstream 138 in order to obtain a decoded second signal 148, 152, 158. For example, the electronic device 134 may decode 306 the watermarked bitstream 138 using a "legacy" decoder. For instance, the electronic device 134 may use an adaptive multi-rate (AMR) narrowband (NB) decoder to obtain the decoded second signal 152.

The electronic device 134 may decode 308 the watermarked bitstream 138 based on the decoded second signal 152 to obtain a decoded first signal 144, 154. In some configurations, for example, a model (e.g., EVRC-WB) used for a higher frequency band may depend on a decoded narrowband signal 152 (decoded using AMR-NB, for example). In this case, the electronic device 134 may use the decoded second signal 152 to model or decode the watermarked bitstream 138 (e.g., extracted watermark bits) to obtain a decoded first signal 154, 144.

The electronic device 134 may combine 310 the decoded first signal 144 and the decoded second signal 148. In some configurations, for example, the electronic device 134 may combine 310 the decoded first signal 144 and the decoded second signal 148 using a synthesis filter bank, which may produce a combined signal 156.

Figure 4:
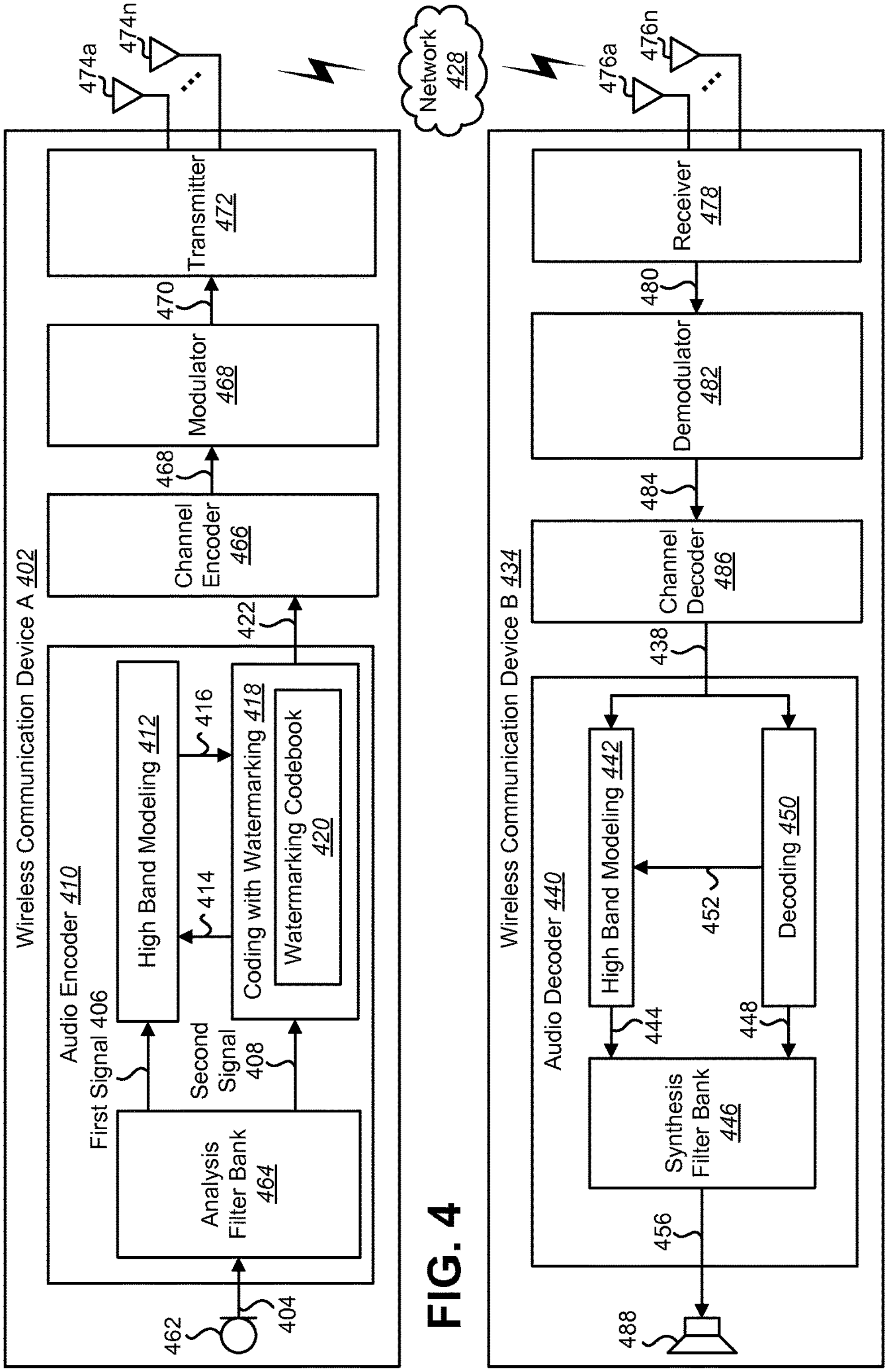
FIG. 4 is a block diagram illustrating one configuration of wireless communication devices in which systems and methods for encoding and decoding a watermarked signal may be implemented.

FIG. 4 is a block diagram illustrating one configuration of wireless communication devices 402, 434 in which systems and methods for encoding and decoding a watermarked signal may be implemented. Examples of wireless communication device A 402 and wireless communication device B 434 may include cellular phones, smart phones, personal digital assistants (PDAs), laptop computers, e-readers, etc.

Wireless communication device A 402 may include a microphone 462, an audio encoder 410, a channel encoder 466, a modulator 468, a transmitter 472 and one or more antennas 474*a-n*. The audio encoder 410 may be used for encoding and watermarking audio. The channel encoder 466, modulator 468, transmitter 472 and one or more antennas 474*a-n* may be used to prepare and transmit one or more signals to another device (e.g., wireless communication device B 434).

Wireless communication device A 402 may obtain an audio signal 404. For example, wireless communication device A 402 may capture the audio signal 404 (e.g., speech) using a microphone 462. The microphone 462 may convert an acoustic signal (e.g., sounds, speech, etc.) into the electrical or electronic audio signal 404. The audio signal 404 may be provided to the audio encoder 410, which may include an analysis filter bank 464, a high-band modeling block/module 412 and a coding with watermarking block/module 418.

The audio signal 404 may be provided to the analysis filter bank 464. The analysis filter bank 464 may divide the audio signal 404 into a first signal 406 and a second signal 408. For example, the first signal 406 may be a higher frequency component signal and the second signal 408 may be a lower frequency component signal. The first signal 406 may be provided to the high-band modeling block/module 412. The second signal 408 may be provided to the coding with watermarking block/module 418.

It should be noted that one or more of the elements 410, 412, 418, 464, 466, 468, 472 included in wireless communication device A 402 may be implemented in hardware, software or a combination of both. For instance, one or more of the elements 410, 412, 418, 464, 466, 468, 472 included in wireless communication device A 402 may be implemented as one or more integrated circuits, application specific integrated circuits (ASICs), etc., and/or using a processor and instructions. It should also be noted that the term "block/module" may also be used to indicate that an element may be implemented in hardware, software or a combination of both.

The coding with watermarking block/module 418 may perform coding on the second signal 408. For example, the coding with watermarking block/module 418 may perform adaptive multi-rate (AMR) coding on the second signal 408. The high-band modeling block/module 412 may determine or calculate parameters or data 416 that may be embedded into the second signal (e.g., "carrier" signal) 408. For example, the coding with watermarking block/module 418 may produce a coded bitstream that watermark bits may be embedded into. The coded second signal 408 with the embedded watermark signal may be referred to as a watermarked second signal 422.

The coding with watermarking block/module 418 may perform a first-pass coding on the second signal 408. This first-pass coding may produce a first-pass coded excitation 414, for example, which may be provided to the high-band modeling block/module 412. In one configuration, the high-band modeling block/module 412 may use an EVRC-WB model to model higher frequency components (from the first signal 406) that relies on lower frequency components (from the second signal 408) that may be encoded by the coding with watermarking block/module 418. Thus, the first-pass coded excitation 414 may be provided to the high-band modeling block/module 412 for use in modeling the higher frequency components. The resulting higher frequency component parameters or bits 416 may then be embedded into the second signal 408 in a second-pass coding, thereby producing the watermarked second signal 422. For example, the second-pass coding may involve the use of a watermarking codebook (e.g., fixed codebook or FCB) 420 to embed high-band bits 416 into a coded second signal 408 to produce the watermarked second signal (e.g., a watermarked bitstream) 422.

The watermarked second signal (e.g., bitstream) 422 may be provided to the channel encoder 466. The channel encoder 466 may encode the watermarked second signal 422 to produce a channel-encoded signal 468. For example, the channel encoder 466 may add error detection coding (e.g., a cyclic redundancy check (CRC)) and/or error correction coding (e.g., forward error correction (FEC) coding) to the watermarked second signal 422.

The channel-encoded signal 468 may be provided to the modulator 468. The modulator 468 may modulate the channel-encoded signal 468 to produce a modulated signal 470. For example, the modulator 468 may map bits in the channel-encoded signal 468 to constellation points. For instance, the modulator 468 may apply a modulation scheme to the channel-encoded signal 468 such as binary phase-shift keying (BPSK), quadrature amplitude modulation (QAM), frequency-shift keying (FSK), etc., to produce the modulated signal 470.

The modulated signal 470 may be provided to the transmitter 472. The transmitter 472 may transmit the modulated signal 470 using the one or more antennas 474*a-n*. For example, the transmitter 472 may upconvert, amplify and transmit the modulated signal 470 using the one or more antennas 474*a-n*.

The modulated signal 470 that includes the watermarked second signal 422 (e.g., a "transmitted signal") may be transmitted from wireless communication device A 402 to another device (e.g., wireless communication device B 434) over a network 428. The network 428 may include the one or more network 428 devices and/or transmission mediums for communicating signals between devices (e.g., between wireless communication device A 402 and wireless communication device B 434). For example, the network 428 may include one or more base stations, routers, servers, bridges, gateways, etc.

In some cases, one or more network 428 devices may transcode the transmitted signal (that includes the watermarked second signal 422). Transcoding may include decoding the transmitted signal and re-encoding it (into another format, for example). In some cases, transcoding may destroy the watermark information embedded in the transmitted signal. In such a case, wireless communication device B 434 may receive a signal that no longer contains the watermark information. Other network 428 devices may not use any transcoding. For instance, if a network 428 uses devices that do not transcode signals, the network may provide tandem-free/transcoder-free operation (TFO/TrFO). In this case, the watermark information embedded in the watermarked second signal 422 may be preserved as it is sent to another device (e.g., wireless communication device B 434).

Wireless communication device B 434 may receive a signal (via the network 428), such as a signal having watermark information preserved or a signal without watermark information. For instance, wireless communication device B 434 may receive a signal using one or more antennas 476*a-n* and a receiver 478. In one configuration, the receiver 478 may downconvert and digitize the signal to produce a received signal 480.

The received signal 480 may be provided to a demodulator 482. The demodulator 482 may demodulate the received signal 480 to produce a demodulated signal 484, which may be provided to a channel decoder 486. The channel decoder 486 may decode the signal (e.g., detect and/or correct errors using error detection and/or correction codes) to produce a (decoded) signal 438.

The signal 438 (e.g., a bitstream) may be provided to an audio decoder 440. For example, the signal 438 may be provided to a high-band modeling block/module 442 and to a decoding block/module 450.

If watermarked information is embedded on the signal 438 (e.g., if the watermarked information has not been lost in transmission), the high-band modeling block/module 442 may model and/or decode the watermark information (e.g., watermark bits) embedded on the signal (e.g., bitstream) 438. For example, the audio decoder 440 may extract watermark bits from the signal 438. The high-band modeling block/module 442 may decode these watermark bits to produce a decoded first signal 444.

The decoding block/module 450 may decode the signal 438. In some configurations, the decoding block/module 450 may use a "legacy" decoder (e.g., a standard narrowband decoder) or decoding procedure that decodes the signal 438 regardless of any watermark information that may be included in the signal 438. The decoding block/module 450 may produce a decoded second signal 448, 452. Thus, for example, if no watermark information is included in the signal 438, the decoding block/module 450 may still recover a version of the second signal 408, which is the decoded second signal 448.

The operations performed by the high-band modeling block/module 442 may depend on operations performed by the decoding block/module 450. For example, a model (e.g., EVRC-WB) used for a higher frequency band may depend on a decoded narrowband signal 452 (decoded using AMR-NB, for example). In this case, the decoded narrowband signal 452 may be provided to the high-band modeling block/module 442.

In some configurations, a decoded second signal 448 may be combined with a decoded first signal 444 by a synthesis filter bank 446 to produce a combined signal 456. For example, the decoded first signal 444 may include higher frequency audio information, while the decoded second signal 448 may include lower frequency audio information. It should be noted that the decoded first signal 444 may be a decoded version of the first signal 406 encoded by wireless communication device A 402. Additionally or alternatively, the decoded second signal 448 may be a decoded version of the second signal 408 encoded by wireless communication device A 402. The synthesis filter bank 446 may combine the decoded first signal 444 and the decoded second signal 448 to produce the combined signal 456, which may be a wide-band audio signal.

The combined signal 456 may be provided to a speaker 488. The speaker 488 may be a transducer that converts electrical or electronic signals into acoustic signals. For instance, the speaker 488 may convert an electronic wide-band audio signal (e.g., the combined signal 456) into an acoustic wide-band audio signal.

If no watermarked information is embedded in the signal 438, the audio decoding block/module 450 may decode the signal 438 (in a legacy mode, for example) to produce the decoded second signal 448. In this case, the synthesis filter bank 446 may be bypassed to provide the decoded second signal 448, without the additional information provided by the first signal 406. This may occur, for example, if the watermark information (from the first signal 406, for example) is destroyed in a transcoding process in the network 428.

It should be noted that one or more of the elements 440, 446, 442, 450, 486, 482, 478 included in wireless communication device B 434 may be implemented in hardware, software or a combination of both. For instance, one or more of the elements 440, 446, 442, 450, 486, 482, 478 included in wireless communication device B 434 may be implemented as one or more integrated circuits, application specific integrated circuits (ASICs), etc., and/or using a processor and instructions.

Figure 5:
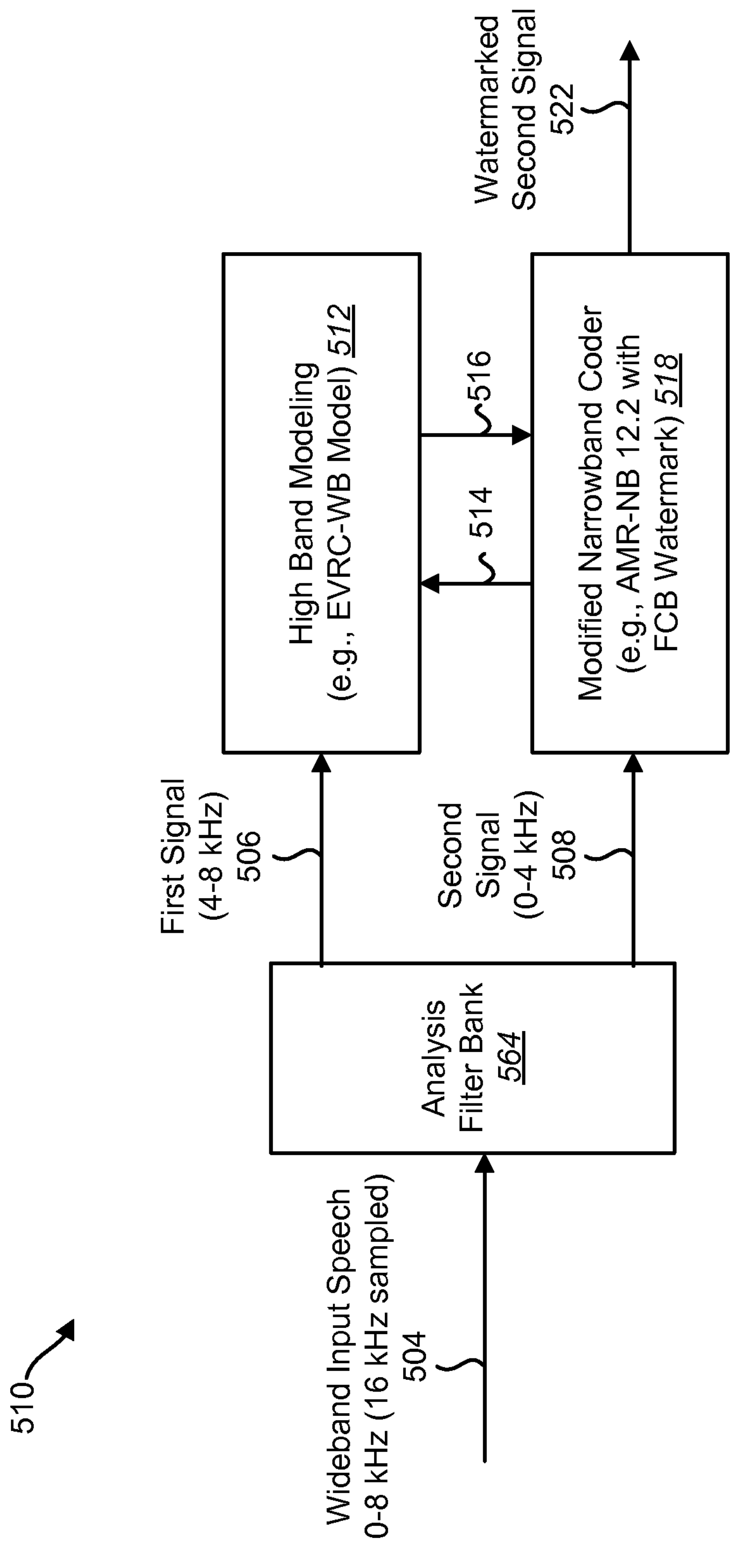
FIG. 5 is a block diagram illustrating one example of a watermarking encoder in accordance with the systems and methods disclosed herein.

FIG. 5 is a block diagram illustrating one example of a watermarking encoder 510 in accordance with the systems and methods disclosed herein. In this example, the encoder 510 may obtain a wideband (WB) speech signal 504, ranging from 0 to 8 kilohertz (kHz). The wideband speech signal 504 may be provided to an analysis filter bank 564 that divides the signal 504 into a first signal 506 or higher frequency component (e.g., 4-8 kHz) and a second signal 508 or lower frequency component (e.g., 0-4 kHz).

The second signal 508 or lower frequency component (e.g., 0-4 kHz) may be provided to a modified narrowband encoder (e.g., AMR-NB 12.2 with a fixed codebook (FCB) watermark). The modified narrowband coder 518 may perform a first-pass coding on the second signal 508 (e.g., lower frequency components) to produce a first-pass coded excitation 514 that is provided to the high-band modeling block/module 512.

The first signal 506 or higher frequency component may also be provided to the high-band modeling block/module 512 (that uses a high band part of the EVRC-WB codec, for example). The high-band modeling block/module 512 may encode or model the first signal 506 (e.g., higher frequency component) based on the first-pass coded excitation 514 provided by the modified narrowband coder 518. The encoding or modeling performed by the high-band modeling block/module 512 may produce high-band bits 516 that are provided to the modified narrowband coder 518.

The modified narrowband coder 518 may embed the high-band bits 516 as a watermark on the second signal 508. For example, the modified narrowband coder 518 may perform a second-pass coding, where the second signal 508 is encoded and the high-band bits 516 are embedded onto the encoded second signal 508 using a watermarking fixed codebook (FCB). Performing the second-pass coding may produce the watermarked second signal 522 or bitstream. It should be noted that the watermarked second signal 522 (e.g., bitstream) may be decodable by a standard (e.g., conventional) decoder, such as standard AMR. However, if a decoder does not include watermark decoding functionality, it may only be able to decode a version of the second signal 508 (e.g., lower frequency component).

Figure 6:
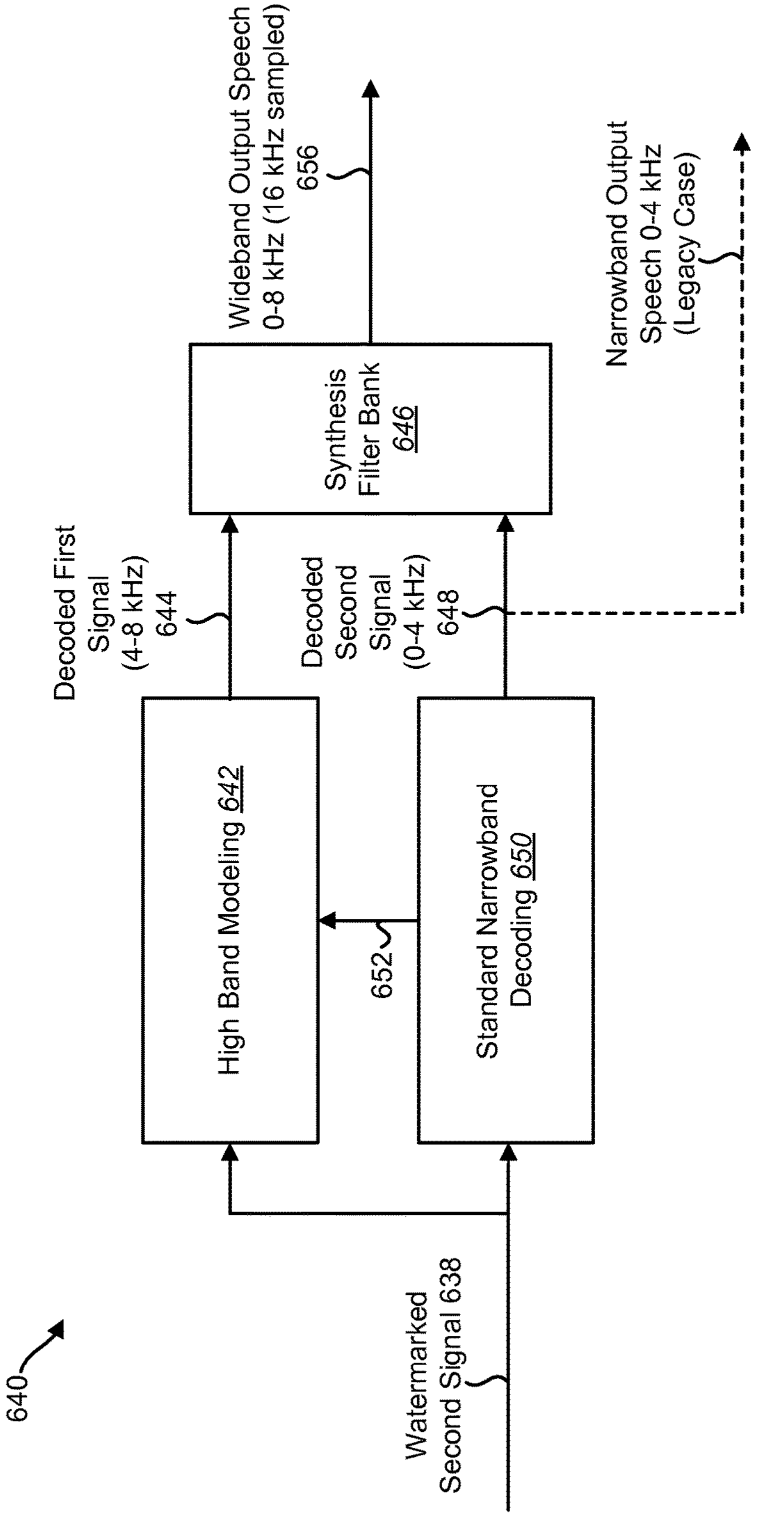
FIG. 6 is a block diagram illustrating one example of a watermarking decoder in accordance with the systems and methods disclosed herein.

FIG. 6 is a block diagram illustrating one example of a watermarking decoder 640 in accordance with the systems and methods disclosed herein. The watermarking decoder 640 may receive a watermarked second signal 638 (e.g., bitstream). The watermarked second signal 638 may be decoded by the standard narrowband decoding block/module 650 to obtain a lower frequency (e.g., 0-4 kHz) component signal 652 (e.g., decoded second signal 648, 652). The decoded lower frequency component signal 652 may be provided to a high-band modeling block/module 642 (e.g., modeler/decoder).

The high-band modeling block/module 642 may extract and/or model watermark information embedded in the watermarked second signal 638 using the lower frequency component signal 652) to obtain a decoded first signal 644 (e.g., a higher frequency component signal ranging from 4-8 kHz). The decoded first signal 644 and the decoded second signal 648 may be combined by a synthesis filter bank 646 to obtain a wideband (e.g., 0-8 kHz, 16 kHz sampled) output speech signal 656. However, in a "legacy" case or a case that a received bitstream does not contain the watermark signal or bits (instead of the watermarked second signal 638), the watermarking decoder 640 may produce a narrowband (e.g., 0-4 kHz) speech output signal (e.g., the decoded second signal 648).

Figure 7:
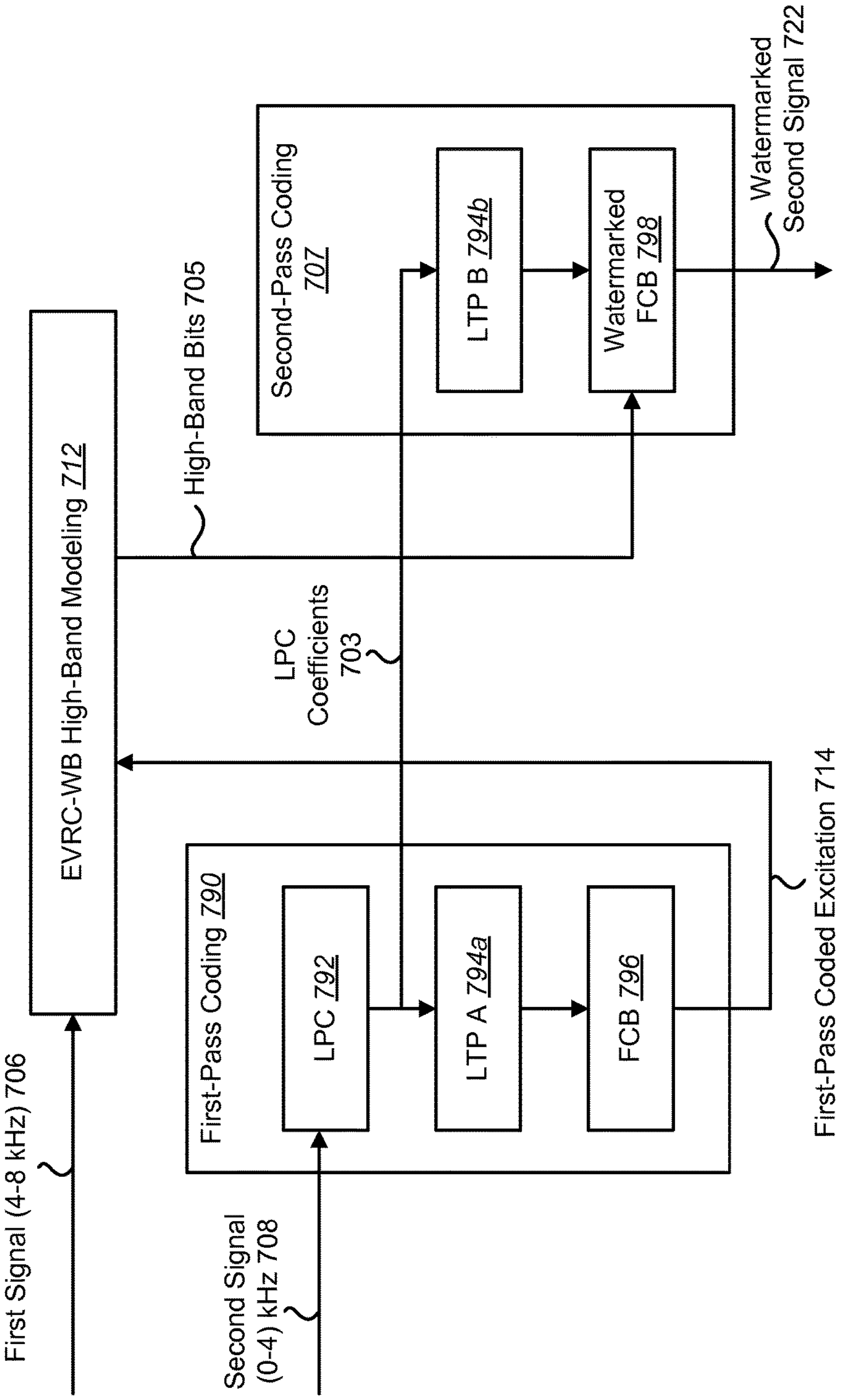
FIG. 7 is a block diagram illustrating one example of first-pass coding and second-pass coding that may be performed in accordance with the systems and methods disclosed herein.

FIG. 7 is a block diagram illustrating one example of first-pass coding 790 and second-pass coding 707 that may be performed in accordance with the systems and methods disclosed herein. In one configuration, the first-pass coding 790 and the second-pass coding 707 may be performed by an encoder 110 (e.g., coder circuitry 118, the coding with watermarking block/module 418 or the modified narrow-band coder 518).

First-pass coding 790 may be performed on a second signal 708, such as a signal in a lower frequency band ranging from 0-4 kHz, for example. In the first-pass coding 790, a linear predictive coding (LPC) operation 792, a first long term prediction (LTP) operation (e.g., LTP A) 794*a* and a fixed codebook (FCB) operation 796 may be performed on the second signal 708 to obtain a first-pass coded excitation 714. LPC coefficients 703 from the first-pass coding 790 may be provided (e.g., stored) for the second-pass coding 707.

The first-pass coded excitation 714 may be provided to an EVRC-WB high-band modeling block/module 712, which models a first signal 706, such as a higher frequency component signal ranging from 4-8 kHz to produce high-band bits 705. The second-pass coding 707 may be performed using the LPC coefficients 703 from the first-pass coding 790. For example, a second LTP operation (e.g., LTP B) 794*b* is performed on the LPC coefficients 703 from the first-pass coding 790. The high-band bits 705 and the output of the second LTP operation 794*b* are used in a watermarked FCB operation 798 to generate the watermarked second signal 722 (e.g., a coded and watermarked bitstream). For example, the watermarked FCB 798 may be used to embed the high-band bits 705 into the carrier (e.g., second signal 708) bitstream to produce the watermarked second signal 722.

Figure 8:
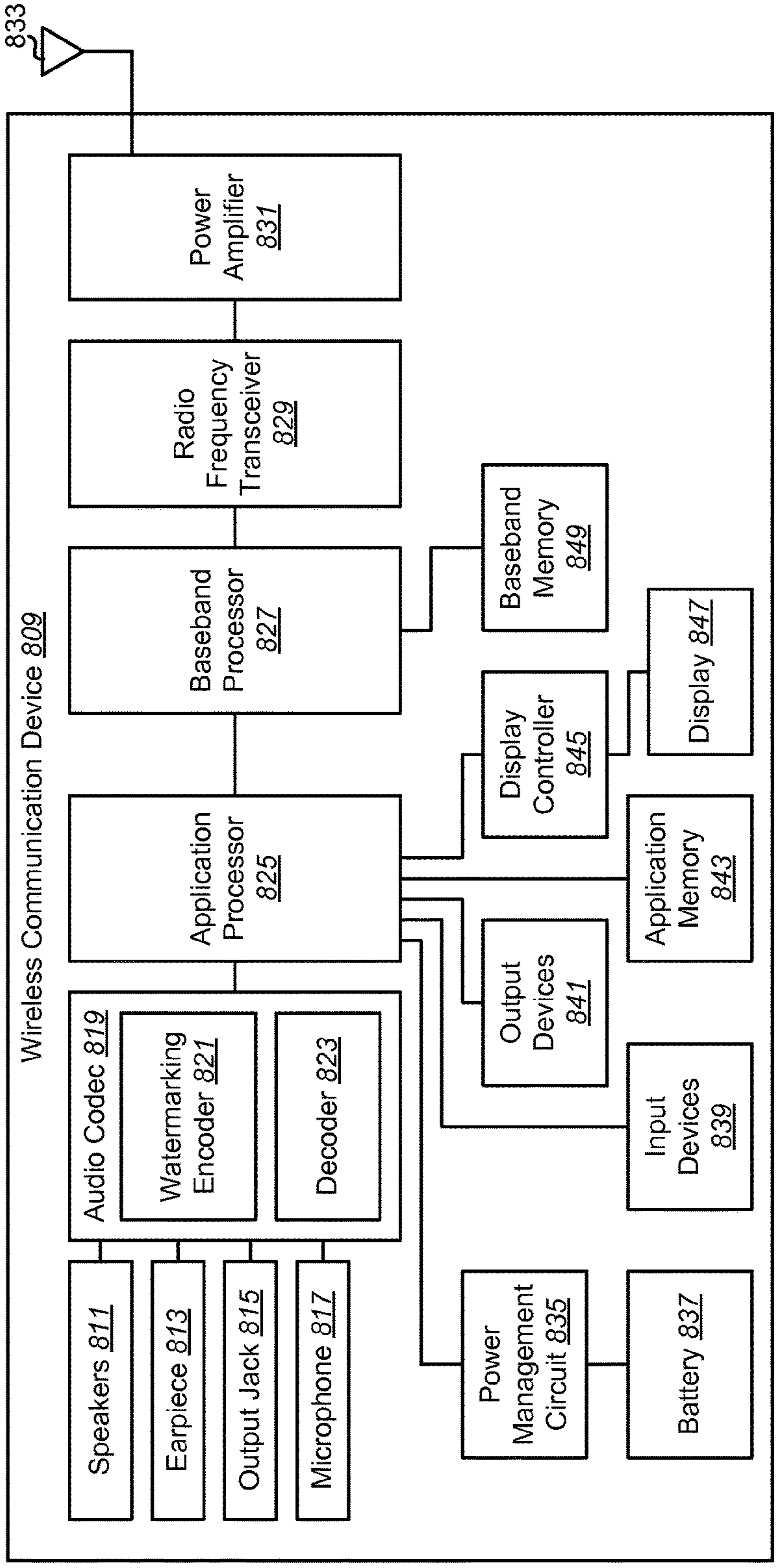
FIG. 8 is a block diagram illustrating one configuration of a wireless communication device in which systems and methods for encoding and decoding a watermarked signal may be implemented.

FIG. 8 is a block diagram illustrating one configuration of a wireless communication device 809 in which systems and methods for encoding and decoding a watermarked signal may be implemented. The wireless communication device 809 may include an application processor 825. The application processor 825 generally processes instructions (e.g., runs programs) to perform functions on the wireless communication device 809. The application processor 825 may be coupled to an audio coder/decoder (codec) 819.

The audio codec 819 may be an electronic device (e.g., integrated circuit) used for coding and/or decoding audio signals. The audio codec 819 may be coupled to one or more speakers 811, an earpiece 813, an output jack 815 and/or one or more microphones 817. The speakers 811 may include one or more electro-acoustic transducers that convert electrical or electronic signals into acoustic signals. For example, the speakers 811 may be used to play music or output a speakerphone conversation, etc. The earpiece 813 may be another speaker or electro-acoustic transducer that can be used to output acoustic signals (e.g., speech signals) to a user. For example, the earpiece 813 may be used such that only a user may reliably hear the acoustic signal. The output jack 815 may be used for coupling other devices to the wireless communication device 809 for outputting audio, such as headphones. The speakers 811, earpiece 813 and/or output jack 815 may generally be used for outputting an audio signal from the audio codec 819. The one or more microphones 817 may be one or more acousto-electric transducers that convert an acoustic signal (such as a user's voice) into electrical or electronic signals that are provided to the audio codec 819.

The audio codec 819 may include a watermarking encoder 821. The encoders 110, 410, 510 described above may be examples of the watermarking encoder 821. The watermarking encoder 821 may be used to perform the methods 200 described above in connection with FIG. 2 for encoding a watermarked signal.

The audio codec 819 may additionally or alternatively include a decoder 823. The decoders 140, 440, 640 described above may be examples of the decoder 823. The decoder 823 may perform the method 300 described above in connection with FIG. 3 for decoding a watermarked signal.

The application processor 825 may also be coupled to a power management circuit 835. One example of the power management circuit 835 is a power management integrated circuit (PMIC), which may be used to manage the electrical power consumption of the wireless communication device 809. The power management circuit 835 may be coupled to a battery 837. The battery 837 may generally provide electrical power to the wireless communication device 809.

The application processor 825 may be coupled to one or more input devices 839 for receiving input. Examples of input devices 839 include infrared sensors, image sensors, accelerometers, touch sensors, keypads, etc. The input devices 839 may allow user interaction with the wireless communication device 809. The application processor 825 may also be coupled to one or more output devices 841. Examples of output devices 841 include printers, projectors, screens, haptic devices, etc. The output devices 841 may allow the wireless communication device 809 to produce output that may be experienced by a user.

The application processor 825 may be coupled to application memory 843. The application memory 843 may be any electronic device that is capable of storing electronic information. Examples of application memory 843 include double data rate synchronous dynamic random access memory (DDRAM), synchronous dynamic random access memory (SDRAM), flash memory, etc. The application memory 843 may provide storage for the application processor 825. For instance, the application memory 843 may store data and/or instructions for the functioning of programs that are run on the application processor 825.

The application processor 825 may be coupled to a display controller 845, which in turn may be coupled to a display 847. The display controller 845 may be a hardware block that is used to generate images on the display 847. For example, the display controller 845 may translate instructions and/or data from the application processor 825 into images that can be presented on the display 847. Examples of the display 847 include liquid crystal display (LCD) panels, light emitting diode (LED) panels, cathode ray tube (CRT) displays, plasma displays, etc.

The application processor 825 may be coupled to a baseband processor 827. The baseband processor 827 generally processes communication signals. For example, the baseband processor 827 may demodulate and/or decode received signals. Additionally or alternatively, the baseband processor 827 may encode and/or modulate signals in preparation for transmission.

The baseband processor 827 may be coupled to baseband memory 849. The baseband memory 849 may be any electronic device capable of storing electronic information, such as SDRAM, DDRAM, flash memory, etc. The baseband processor 827 may read information (e.g., instructions and/or data) from and/or write information to the baseband memory 849. Additionally or alternatively, the baseband processor 827 may use instructions and/or data stored in the baseband memory 849 to perform communication operations.

The baseband processor 827 may be coupled to a radio frequency (RF) transceiver 829. The RF transceiver 829 may be coupled to a power amplifier 831 and one or more antennas 833. The RF transceiver 829 may transmit and/or receive radio frequency signals. For example, the RF transceiver 829 may transmit an RF signal using a power amplifier 831 and one or more antennas 833. The RF transceiver 829 may also receive RF signals using the one or more antennas 833. The wireless communication device 809 may be one example of an electronic device 102, 134, or wireless communication device 402, 434 as described herein.

Figure 9:
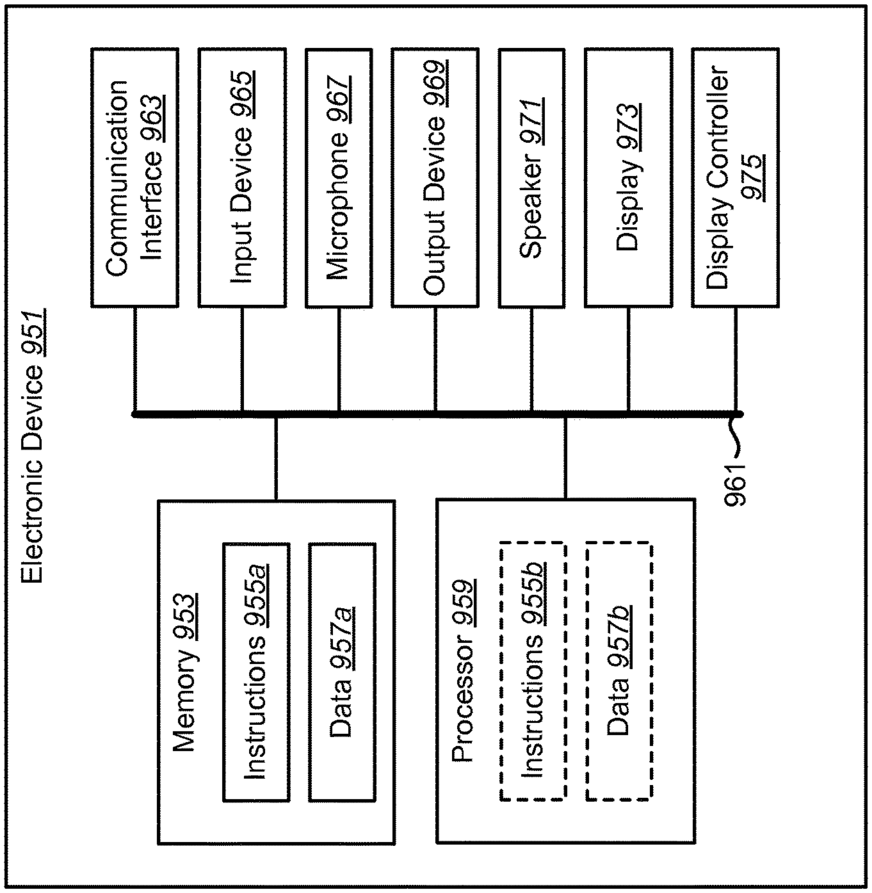
FIG. 9 illustrates various components that may be utilized in an electronic device.

FIG. 9 illustrates various components that may be utilized in an electronic device 951. The illustrated components may be located within the same physical structure or in separate housings or structures. One or more of the electronic devices 102, 134 described previously may be configured similarly to the electronic device 951. The electronic device 951 includes a processor 959. The processor 959 may be a general purpose single- or multi-chip microprocessor (e.g., an ARM), a special purpose microprocessor (e.g., a digital signal processor (DSP)), a microcontroller, a programmable gate array, etc. The processor 959 may be referred to as a central processing unit (CPU). Although just a single processor 959 is shown in the electronic device 951 of FIG. 9, in an alternative configuration, a combination of processors (e.g., an ARM and DSP) could be used.

The electronic device 951 also includes memory 953 in electronic communication with the processor 959. That is, the processor 959 can read information from and/or write information to the memory 953. The memory 953 may be any electronic component capable of storing electronic information. The memory 953 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 957*a* and instructions 955*a* may be stored in the memory 953. The instructions 955*a* may include one or more programs, routines, sub-routines, functions, procedures, etc. The instructions 955*a* may include a single computer-readable statement or many computer-readable statements. The instructions 955*a* may be executable by the processor 959 to implement one or more of the methods 200, 300 described above. Executing the instructions 955*a* may involve the use of the data 957*a* that is stored in the memory 953. FIG. 9 shows some instructions 955*b* and data 957*b* being loaded into the processor 959 (which may come from instructions 955*a* and data 957*a*).

The electronic device 951 may also include one or more communication interfaces 963 for communicating with other electronic devices. The communication interfaces 963 may be based on wired communication technology, wireless communication technology, or both. Examples of different types of communication interfaces 963 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 951 may also include one or more input devices 965 and one or more output devices 969. Examples of different kinds of input devices 965 include a keyboard, mouse, microphone, remote control device, button, joystick, trackball, touchpad, lightpen, etc. For instance, the electronic device 951 may include one or more microphones 967 for capturing acoustic signals. In one configuration, a microphone 967 may be a transducer that converts acoustic signals (e.g., voice, speech) into electrical or electronic signals. Examples of different kinds of output devices 969 include a speaker, printer, etc. For instance, the electronic device 951 may include one or more speakers 971. In one configuration, a speaker 971 may be a transducer that converts electrical or electronic signals into acoustic signals. One specific type of output device which may be typically included in an electronic device 951 is a display device 973. Display devices 973 used with configurations disclosed herein may utilize any suitable image projection technology, such as a cathode ray tube (CRT), liquid crystal display (LCD), light-emitting diode (LED), gas plasma, electroluminescence, or the like. A display controller 975 may also be provided, for converting data stored in the memory 953 into text, graphics, and/or moving images (as appropriate) shown on the display device 973.

The various components of the electronic device 951 may be coupled together by one or more buses, which may include a power bus, a control signal bus, a status signal bus, a data bus, etc. For simplicity, the various buses are illustrated in FIG. 9 as a bus system 961. It should be noted that FIG. 9 illustrates only one possible configuration of an electronic device 951. Various other architectures and components may be utilized.

Figure 10:
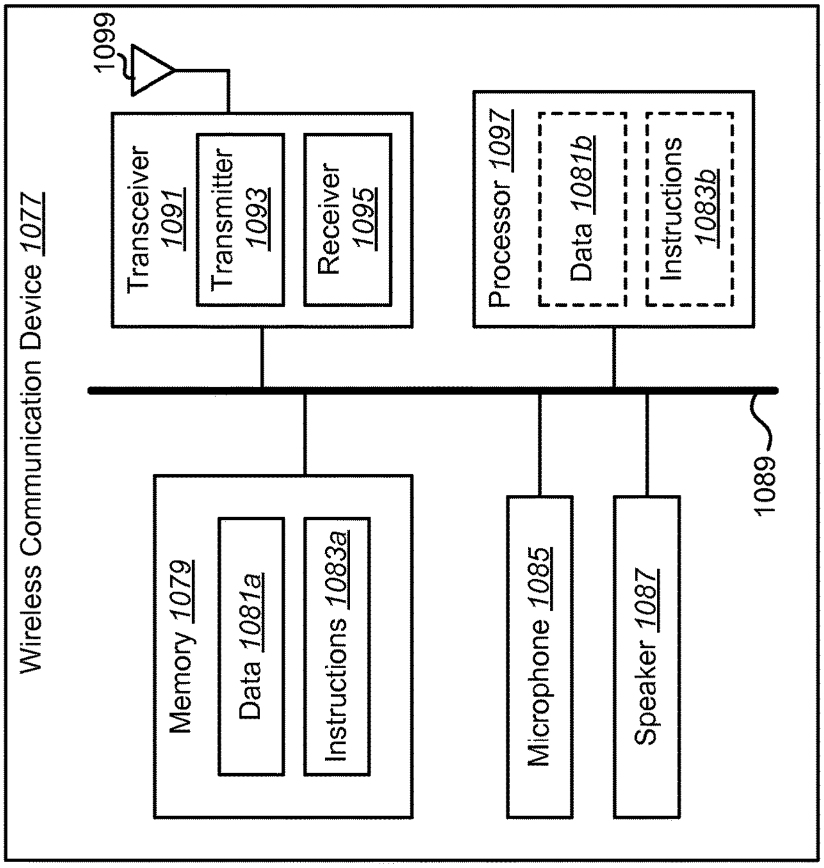
FIG. 10 illustrates certain components that may be included within a wireless communication device.

FIG. 10 illustrates certain components that may be included within a wireless communication device 1077. One or more of the electronic devices 102, 134, 951 and/or the wireless communication devices 402, 434, 809 described above may be configured similarly to the wireless communication device 1077 that is shown in FIG. 10.

The wireless communication device 1077 includes a processor 1097. The processor 1097 may be a general purpose single- or multi-chip microprocessor (e.g., an ARM), a special purpose microprocessor (e.g., a digital signal processor (DSP)), a microcontroller, a programmable gate array, etc. The processor 1097 may be referred to as a central processing unit (CPU). Although just a single processor 1097 is shown in the wireless communication device 1077 of FIG. 10, in an alternative configuration, a combination of processors (e.g., an ARM and DSP) could be used.

The wireless communication device 1077 also includes memory 1079 in electronic communication with the processor 1097 (i.e., the processor 1097 can read information from and/or write information to the memory 1079). The memory 1079 may be any electronic component capable of storing electronic information. The memory 1079 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1081*a* and instructions 1083*a* may be stored in the memory 1079. The instructions 1083*a* may include one or more programs, routines, sub-routines, functions, procedures, code, etc. The instructions 1083*a* may include a single computer-readable statement or many computer-readable statements. The instructions 1083*a* may be executable by the processor 1097 to implement one or more of the methods 200, 300 described above. Executing the instructions 1083*a* may involve the use of the data 1081*a* that is stored in the memory 1079. FIG. 10 shows some instructions 1083*b* and data 1081*b* being loaded into the processor 1097 (which may come from instructions 1083*a* and data 1081*a*).

The wireless communication device 1077 may also include a transmitter 1093 and a receiver 1095 to allow transmission and reception of signals between the wireless communication device 1077 and a remote location (e.g., another electronic device, wireless communication device, etc.). The transmitter 1093 and receiver 1095 may be collectively referred to as a transceiver 1091. An antenna 1099 may be electrically coupled to the transceiver 1091. The wireless communication device 1077 may also include (not shown) multiple transmitters, multiple receivers, multiple transceivers and/or multiple antenna.

In some configurations, the wireless communication device 1077 may include one or more microphones 1085 for capturing acoustic signals. In one configuration, a microphone 1085 may be a transducer that converts acoustic signals (e.g., voice, speech) into electrical or electronic signals. Additionally or alternatively, the wireless communication device 1077 may include one or more speakers 1087. In one configuration, a speaker 1087 may be a transducer that converts electrical or electronic signals into acoustic signals.

The various components of the wireless communication device 1077 may be coupled together by one or more buses, which may include a power bus, a control signal bus, a status signal bus, a data bus, etc. For simplicity, the various buses are illustrated in FIG. 10 as a bus system 1089.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:

modeler circuitry, wherein the modeler circuitry is configured to determine parameters based on a first signal and a first-pass coded signal; and coder circuitry coupled to the modeler circuitry, wherein the coder circuitry is configured to perform a first-pass coding on a second signal to obtain the first-pass coded signal and to perform a second-pass coding of the second signal based on the parameters to obtain a watermarked signal, wherein the first-pass coding is a first code-excited linear prediction (CELP) coding based on a fixed codebook, wherein the first-pass coding is conducted with no watermark, and the second-pass coding is a second CELP coding based on the fixed codebook with watermarking, and wherein the first signal and the second signal are digital audio signals.

2. The electronic device of claim 1, wherein the first-pass coded signal is a first-pass coded excitation.

3. The electronic device of claim 1, further comprising a transmitter configured to send the watermarked signal.

4. The electronic device of claim 1, wherein the second-pass coding is based on a set of linear predictive coding coefficients obtained from the first-pass coding.

5. The electronic device of claim 1, wherein the first signal is a higher frequency component signal and the second signal is a lower frequency component signal.

6. The electronic device of claim 1, wherein the coder circuitry comprises an adaptive multi-rate narrowband (AMR-NB) coder.

7. The electronic device of claim 1, wherein the coder circuitry is configured to perform the second-pass coding using a second long term prediction (LTP) operation after a first LTP operation of the first-pass coding.

8. The electronic device of claim 1, further comprising an analysis filter bank configured to divide a signal into the first signal and the second signal.

9. The electronic device of claim 1, wherein the modeler circuitry is configured to determine the parameters based on high band coding.

10. The electronic device of claim 1, wherein the watermarked signal is decodable to recover a version of the second signal without information from the first signal.

11. An electronic device, comprising:

modeler circuitry configured to produce a decoded first signal based on a decoded second signal and a watermarked bitstream, wherein the watermarked bitstream comprises second-pass coding, wherein the second-pass coding is a second code-excited linear prediction (CELP) coding based on a fixed codebook with watermarking subsequent to a first-pass coding that comprises a first CELP coding based on the fixed codebook, wherein the first-pass coding is conducted with no watermark; and decoder circuitry coupled to the modeler circuitry, wherein the decoder circuitry is configured to provide the decoded second signal based on the watermarked bitstream, and wherein the decoded first signal and the decoded second signal are digital audio signals.

12. The electronic device of claim 11, further comprising combining circuitry configured to combine the decoded first signal and the decoded second signal.

13. The electronic device of claim 12, wherein the combining circuitry comprises a synthesis filter bank.

14. The electronic device of claim 11, wherein the decoded first signal comprises a higher frequency component signal and the decoded second signal comprises a lower frequency component signal.

15. A method for encoding a watermarked signal on an electronic device, comprising:

obtaining a first signal and a second signal;

performing a first-pass coding on the second signal to obtain a first-pass coded signal, wherein the first-pass coding is a first code-excited linear prediction (CELP) coding based on a fixed codebook, wherein the first-pass coding is conducted with no watermark;

determining parameters based on the first signal and the first-pass coded signal; and performing a second-pass coding of the second signal based on the parameters to obtain a watermarked signal, wherein the second-pass coding is a second CELP coding based on the fixed codebook with watermarking, and wherein the first signal and the second signal are digital audio signals.

16. The method of claim 15, wherein the first-pass coded signal is a first-pass coded excitation.

17. The method of claim 15, further comprising sending the watermarked signal.

18. The method of claim 15, wherein the second-pass coding uses a set of linear predictive coding coefficients obtained from the first-pass coding.

19. The method of claim 15, wherein the first signal is a higher frequency component signal and the second signal is a lower frequency component signal.

20. The method of claim 15, wherein the first-pass coding is performed using an adaptive multi-rate narrowband (AMR-NB) coder.

21. The method of claim 15, wherein the second-pass coding is performed using a second long term prediction (LTP) operation after a first LTP operation of the first-pass coding.

22. The method of claim 15, further comprising dividing a signal into the first signal and the second signal.

23. The method of claim 15, wherein the parameters are determined based on high band coding.

24. The method of claim 15, wherein the watermarked signal is decodable to recover a version of the second signal without information from the first signal.

25. A method for decoding a watermarked signal on an electronic device, comprising:

decoding a watermarked bitstream to obtain a decoded second signal; and decoding the watermarked bitstream based on the decoded second signal to obtain a decoded first signal, wherein the decoded first signal and the decoded second signal are digital audio signals, and wherein the watermarked bitstream comprises second-pass coding, wherein the second-pass coding is a second code-excited linear prediction (CELP) coding based on a fixed codebook with watermarking subsequent to a first-pass coding that comprises a first CELP coding based on the fixed codebook, wherein the first-pass coding is conducted with no watermark.

26. The method of claim 25, further comprising combining the decoded first signal and the decoded second signal.

27. The method of claim 26, wherein the decoded first signal and the decoded second signal are combined using a synthesis filter bank.

28. The method of claim 25, wherein the decoded first signal comprises a higher frequency component signal and the decoded second signal comprises a lower frequency component signal.

29. A computer-program product for encoding a watermarked signal, comprising a non-transitory tangible computer-readable medium having instructions thereon, the instructions comprising:

code for causing an electronic device to obtain a first signal and a second signal;

code for causing the electronic device to perform a first-pass coding on the second signal to obtain a first-pass coded signal, wherein the first-pass coding is a first code-excited linear prediction (CELP) coding based on a fixed codebook, wherein the first-pass coding is conducted with no watermark;

code for causing the electronic device to determine parameters based on the first signal and the first-pass coded signal; and code for causing the electronic device to perform a second-pass coding of the second signal based on the parameters to obtain a watermarked signal, wherein the second-pass coding is a second CELP coding based on the fixed codebook with watermarking, and wherein the first signal and the second signal are digital audio signals.

30. The computer-program product of claim 29, wherein the first-pass coded signal is a first-pass coded excitation.

31. The computer-program product of claim 29, wherein the second-pass coding uses a set of linear predictive coding coefficients obtained from the first-pass coding.

32. The computer-program product of claim 29, wherein the first signal is a higher frequency component signal and the second signal is a lower frequency component signal.

33. The computer-program product of claim 29, wherein the second-pass coding is performed using a second long term prediction (LTP) operation after a first LTP operation of the first-pass coding.

34. A computer-program product for decoding a watermarked signal, comprising a non-transitory tangible computer-readable medium having instructions thereon, the instructions comprising:

code for causing an electronic device to decode a watermarked bitstream to obtain a decoded second signal; and code for causing the electronic device to decode the watermarked bitstream based on the decoded second signal to obtain a decoded first signal, wherein the decoded first signal and the decoded second signal are digital audio signals, and wherein the watermarked bitstream comprises second-pass coding, wherein the second-pass coding is a second code-excited linear prediction (CELP) coding based on a fixed codebook with watermarking subsequent to a first-pass coding that comprises a first CELP coding based on the fixed codebook, wherein the first-pass coding is conducted with no watermark.

35. The computer-program product of claim 34, the instructions further comprising code for causing the electronic device to combine the decoded first signal and the decoded second signal.

36. The computer-program product of claim 34, wherein the decoded first signal comprises a higher frequency component signal and the decoded second signal comprises a lower frequency component signal.

37. An apparatus for encoding a watermarked signal, comprising:

means for obtaining a first signal and a second signal;

means for performing a first-pass coding on the second signal to obtain a first-pass coded signal, wherein the first-pass coding is a first code-excited linear prediction (CELP) coding based on a fixed codebook, wherein the first-pass coding is conducted with no watermark;

means for determining parameters based on the first signal and the first-pass coded signal; and means for performing a second-pass coding of the second signal based on the parameters to obtain a watermarked signal, wherein the second-pass coding is a second CELP coding based on the fixed codebook with watermarking, and wherein the first signal and the second signal are digital audio signals.

38. The apparatus of claim 37, wherein the first-pass coded signal is a first-pass coded excitation.

39. The apparatus of claim 37, wherein the second-pass coding uses a set of linear predictive coding coefficients obtained from the first-pass coding.

40. The apparatus of claim 37, wherein the first signal is a higher frequency component signal and the second signal is a lower frequency component signal.

41. The apparatus of claim 37, wherein the second-pass coding is performed using a second long term prediction (LTP) operation after a first LTP operation of the first-pass coding.

42. An apparatus for decoding a watermarked signal, comprising:

a second means for decoding a watermarked bitstream to obtain a decoded second signal; and a first means for decoding the watermarked bitstream based on the decoded second signal to obtain a decoded first signal, wherein the decoded first signal and the decoded second signal are digital audio signals, and wherein the watermarked bitstream comprises second-pass coding, wherein the second-pass coding is a second code-excited linear prediction (CELP) coding based on a fixed codebook with watermarking subsequent to a first-pass coding that comprises a first CELP coding based on the fixed codebook, wherein the first-pass coding is conducted with no watermark.

43. The apparatus of claim 42, further comprising means for combining the decoded first signal and the decoded second signal.

44. The apparatus of claim 42, wherein the decoded first signal comprises a higher frequency component signal and the decoded second signal comprises a lower frequency component signal.

* * * * *